US012738190B2

(12) United States Patent
Wu et al.

(10) Patent No.: US 12,738,190 B2
(45) Date of Patent: Sep. 15, 2026

(54) LIGHT EMISSION CONTROL METHOD

(71) Applicant: MACROBLOCK, INC., Hsinchu (TW)

(72) Inventors: Ming-Jia Wu, Hsinchu (TW); Chi-Min Hsieh, Hsinchu (TW)

(73) Assignee: MACROBLOCK, INC., Hsinchu (TW)

( * ) Notice: Subject to any disclaimer, the term of this patent is extended or adjusted under 35 U.S.C. 154(b) by 0 days.

(21) Appl. No.: 19/097,067

(22) Filed: Apr. 1, 2025

(65) Prior Publication Data

US 2025/0308429 A1 Oct. 2, 2025

(30) Foreign Application Priority Data

Apr. 2, 2024 (TW) ................................ 113112594

(51) Int. Cl.
*G09G 3/20* (2006.01)
*G09G 3/32* (2016.01)

(52) U.S. Cl.
CPC ............. *G09G 3/2018* (2013.01); *G09G 3/32* (2013.01); *G09G 2320/0233* (2013.01); *G09G 2360/16* (2013.01)

(58) Field of Classification Search
CPC .................. G09G 3/2018; G09G 3/32; G09G 2320/0233; G09G 2360/16
See application file for complete search history.

(56) References Cited

U.S. PATENT DOCUMENTS

| | | | | |
|---|---|---|---|---|
| 12,062,345 | B2 * | 8/2024 | Shin | G09G 3/2025 |
| 12,190,798 | B1 * | 1/2025 | Cui | G09G 3/32 |
| 12,597,399 | B2 * | 4/2026 | Shin | G09G 3/2025 |
| 2023/0395012 | A1 * | 12/2023 | Lyu | G09G 3/2081 |

* cited by examiner

*Primary Examiner* — Gene W Lee
(74) *Attorney, Agent, or Firm* — Nixon & Vanderhye PC

(57) ABSTRACT

A light emission control method includes: dividing a display time period into multiple display time intervals; obtaining a brightness threshold value; when it is determined that an original grayscale data value is greater than the brightness threshold value, obtaining multiple pulse width values that respectively correspond to the display time intervals, where each of the pulse width values is no less than one, and a sum of the pulse width values is equal to the original grayscale data value; and with respect to each of the display time intervals, when it is determined that the pulse width value that corresponds to the display time interval is greater than a predetermined reference value, driving the light emitting element in a first drive way, and otherwise, driving the light emitting element in a second drive way.

12 Claims, 4 Drawing Sheets

LIGHT EMISSION CONTROL METHOD

CROSS-REFERENCE TO RELATED APPLICATION

This application claims priority to Taiwanese Invention Patent Application No. 113112594, filed on Apr. 2, 2024, the entire disclosure of which is incorporated by reference herein.

FIELD

The disclosure relates to display techniques, and more particularly to a light emission control method that can achieve a high refresh rate at low grayscale levels.

BACKGROUND

Light emitting diodes (LEDs) have advantages such as having a long usable time, having a wide viewing angle, and can be assembled into any size as needed, etc., and have been widely used in fields such as displays, lighting decoration and lighting, etc. A conventional LED light emission control method adopts a scrambled pulse width modulation (SPWM) algorithm. The SPWM algorithm scrambles a pulse of a pulse width modulation signal, which is for conducting an LED and has a large pulse width, into multiple pulses, each of which has a short pulse width, so as to increase a refresh rate of the LED, thereby enhancing grayscale contrast and display effect of the LED. However, conventional SPWM algorithms do not work well at low grayscale levels.

In Chinese Patent Application Publication No. CN115938287A, when a compensated grayscale data of an LED is no less than a total number of scramble groups of $2^N$, a magnitude of a conduction current of the LED is set to a predetermined current value, and a length of a conduction time of the LED is set to a predetermined time length that is correlated to the compensated grayscale data. When the compensated grayscale data of the LED is less than $2^N$, the magnitude of the conduction current of the LED is decreased to $\frac{1}{2}^P$ times the predetermined current value, and the length of the conduction time of the LED is increased to $2^P$ times a predetermined time length that is correlated to the compensated grayscale data, so as to increase a refresh rate of the LED. However, since the magnitude of the conduction current of the LED is different between when the compensated grayscale data is $2^N-1$ and when the compensated grayscale data is $2^N$, brightness of the LED may change significantly when the compensated grayscale data switches between $2^N-1$ and $2^N$, resulting in brightness discontinuity. As depicted by a curve 100 of FIG. 1, the brightness of the LED may be higher when the compensated grayscale data is $2^N-1$ (e.g., fifteen) than when the compensated grayscale data is $2^N$ (e.g., sixteen), so the brightness of the LED may not always increase along with the increase of the compensated grayscale data.

SUMMARY

Therefore, an object of the disclosure is to provide a light emission control method that can alleviate the drawback of the prior art.

According to an aspect of the disclosure, the light emission control method is to be implemented by a driver circuit, is for controlling a light emitting element, and includes steps of: (A) dividing a display time period of an image frame into a number (N) of display time intervals, where the number (N) is an integer no less than two; (B) obtaining a brightness threshold value that is no less than the number (N); (C) determining whether an original grayscale data value that corresponds to a to-be-displayed grayscale value is greater than the brightness threshold value; (D) when it is determined that the original grayscale data value is greater than the brightness threshold value, obtaining a number (N) of pulse width values that respectively correspond to the number (N) of display time intervals, where each of the number (N) of pulse width values is no less than one, and a sum of the number (N) of pulse width values is equal to the original grayscale data value; (E) with respect to each of the number (N) of display time intervals, determining whether the pulse width value that corresponds to the display time interval is greater than a predetermined reference value; (F) with respect to each of the number (N) of display time intervals, when it is determined that the pulse width value that corresponds to the display time interval is greater than the predetermined reference value, driving the light emitting element in a first drive way so that a current flows through the light emitting element during a light emission time segment in the display time interval, a magnitude of the current is equal to a predetermined current value, and a length of the light emission time segment is equal to the pulse width value that corresponds to the display time interval times a predetermined time length; and (G) with respect to each of the number (N) of display time intervals, when it is determined that the pulse width value that corresponds to the display time interval is not greater than the predetermined reference value, driving the light emitting element in a second drive way so that a current flows through the light emitting element during a light emission time segment in the display time interval, a magnitude of the current is less than the predetermined current value, and a length of the light emission time segment is greater than the pulse width value that corresponds to the display time interval times the predetermined time length.

According to another aspect of the disclosure, the light emission control method is to be implemented by a driver circuit, is for controlling a light emitting element, and includes steps of: (A) determining whether an original grayscale data value is greater than a brightness threshold value; (B) when it is determined that the original grayscale data value is greater than the brightness threshold value, obtaining a number (N) of pulse width values that respectively correspond to a number (N) of display time intervals, where N is an integer that is no less than two and no greater than the brightness threshold value, each of the number (N) of pulse width values is no less than one, and a sum of the number (N) of pulse width values is equal to the original grayscale data value; (C) with respect to each of the number (N) of display time intervals, determining whether the pulse width value that corresponds to the display time interval is greater than a predetermined reference value; (D) with respect to each of the number (N) of display time intervals, when it is determined that the pulse width value that corresponds to the display time interval is greater than the predetermined reference value, driving the light emitting element in a first drive way so that a current flows through the light emitting element during a light emission time segment in the display time interval, a magnitude of the current is equal to a predetermined current value, and a length of the light emission time segment is equal to the pulse width value that corresponds to the display time interval times a predetermined time length; and (E) with respect to each of the number (N) of display time intervals, when it is determined that the pulse width value that corresponds to the display time interval is not greater than the predetermined reference value, driving the light emitting element in a second drive way so that a current flows through the light emitting element during a light emission time segment in the display time interval, a magnitude of the current is less than the predetermined current value, and a length of the light emission time segment is greater than the pulse width value that corresponds to the display time interval times the predetermined time length.

According to yet another aspect of the disclosure, the light emission control method is to be implemented by a driver circuit, is for controlling a light emitting element, and includes steps of: (A) determining whether an original grayscale data value is greater than a brightness threshold value; (B) when it is determined that the original grayscale data value is greater than the brightness threshold value, obtaining a number (N) of first pulse width values that respectively correspond to a number (N) of display time intervals, where N is an integer that is no less than two and no greater than the brightness threshold value, each of the number (N) of first pulse width values is no less than one, and a sum of the number (N) of first pulse width values is equal to the original grayscale data value; (C) with respect to each of the number (N) of display time intervals, driving the light emitting element in a way that a current flows through the light emitting element during a light emission time segment in the display time interval, a magnitude of the current is equal to a predetermined current value, and a length of the light emission time segment is equal to the first pulse width value that corresponds to the display time interval times a predetermined time length; (D) when it is determined that the original grayscale data value is not greater than the brightness threshold value, obtaining an amplified grayscale data value that is equal to M times the original grayscale data value, where M is an integer no less than two; (E) obtaining a number (N) of second pulse width values that respectively correspond to the number (N) of display time intervals, where each of the number (N) of second pulse width values is no less than zero, a sum of the number (N) of second pulse width values is equal to the amplified grayscale data value, and a difference between a maximum and a minimum of the number (N) of second pulse width values is minimized; and (F) with respect to each of the number (N) of display time intervals, when the second pulse width value that corresponds to the display time interval is greater than zero, driving the light emitting element in a way that a current flows through the light emitting element during a light emission time segment in the display time interval, a magnitude of the current causes the light emitting element to have a brightness that is 1/M times the brightness of the light emitting element when being driven by a current having a magnitude of the predetermined current value, and a length of the light emission time segment is equal to the second pulse width value that corresponds to the display time interval times the predetermined time length.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

DETAILED DESCRIPTION

Figure 1:
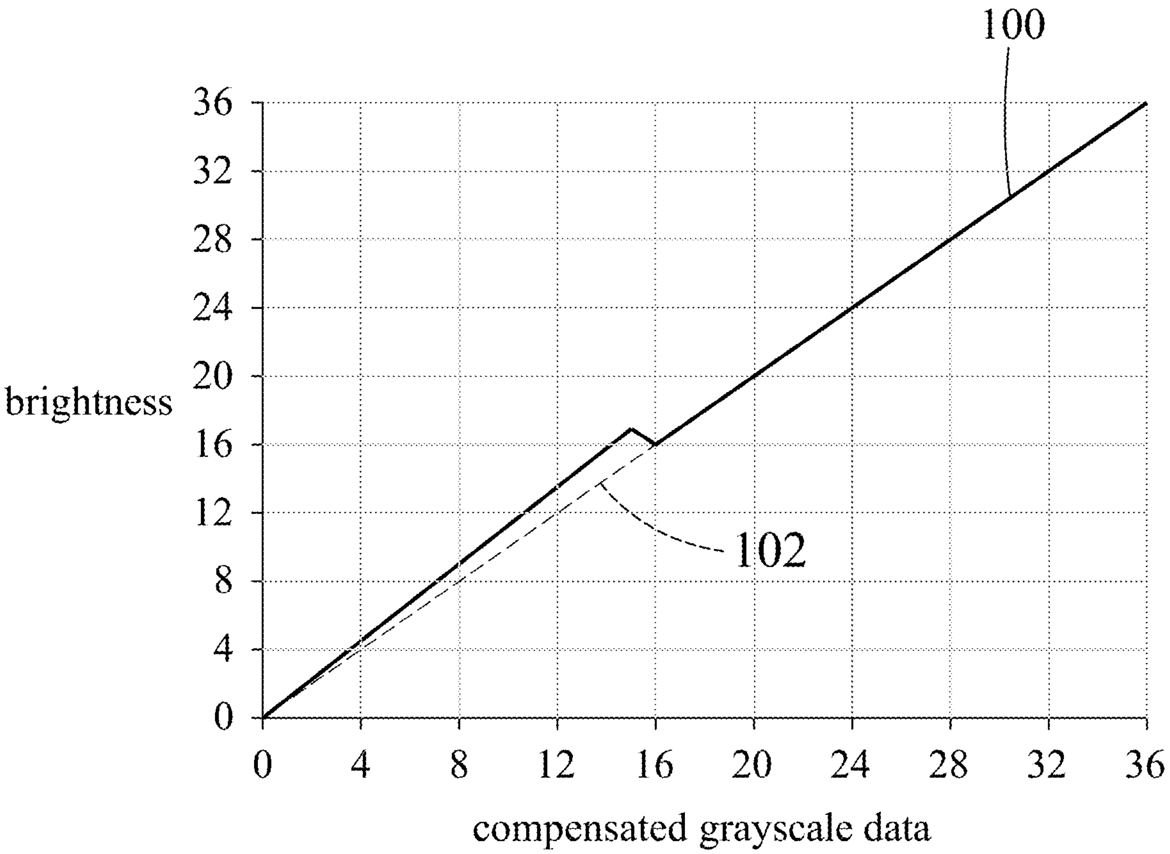
FIG. 1 PRIOR ART
FIG. 1 is a plot illustrating a relationship between brightness and a compensated grayscale data of a light emitting diode (LED) controlled by a conventional LED light emission control method.

Before the disclosure is described in greater detail, it should be noted that where considered appropriate, reference numerals or terminal portions of reference numerals have been repeated among the figures to indicate corresponding or analogous elements, which may optionally have similar characteristics.

Figure 2:
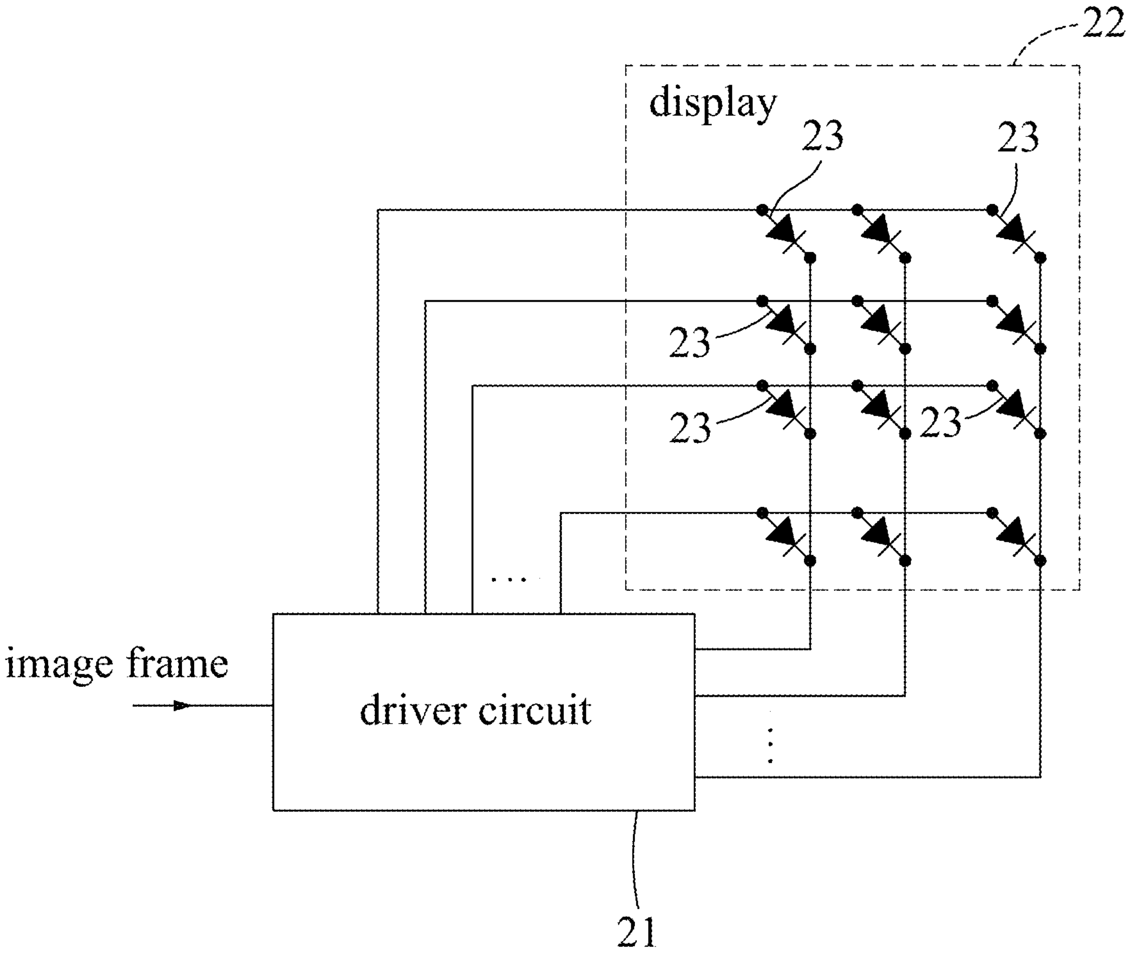
FIG. 2 is a circuit block diagram illustrating a display device in which an embodiment of a light emission control method according to the disclosure is implemented.

Referring to FIG. 2, an embodiment of a light emission control method according to the disclosure is to be implemented in a display device. The display device includes a display 22, and a driver circuit 21 that is connected to the display 22. The display 22 includes a plurality of light emitting elements 23. The light emitting elements 23 are arranged in a matrix that has a plurality of rows and a plurality of columns. Each of the light emitting elements 23 includes a light emitting diode (LED). The diver circuit 21 is configured to receive an image frame, and to cause the display 22 to show the image frame. With respect to each of the light emitting elements 23, the diver circuit 21 performs the light emission control method of this embodiment to control the light emitting element 23.

Figure 3:
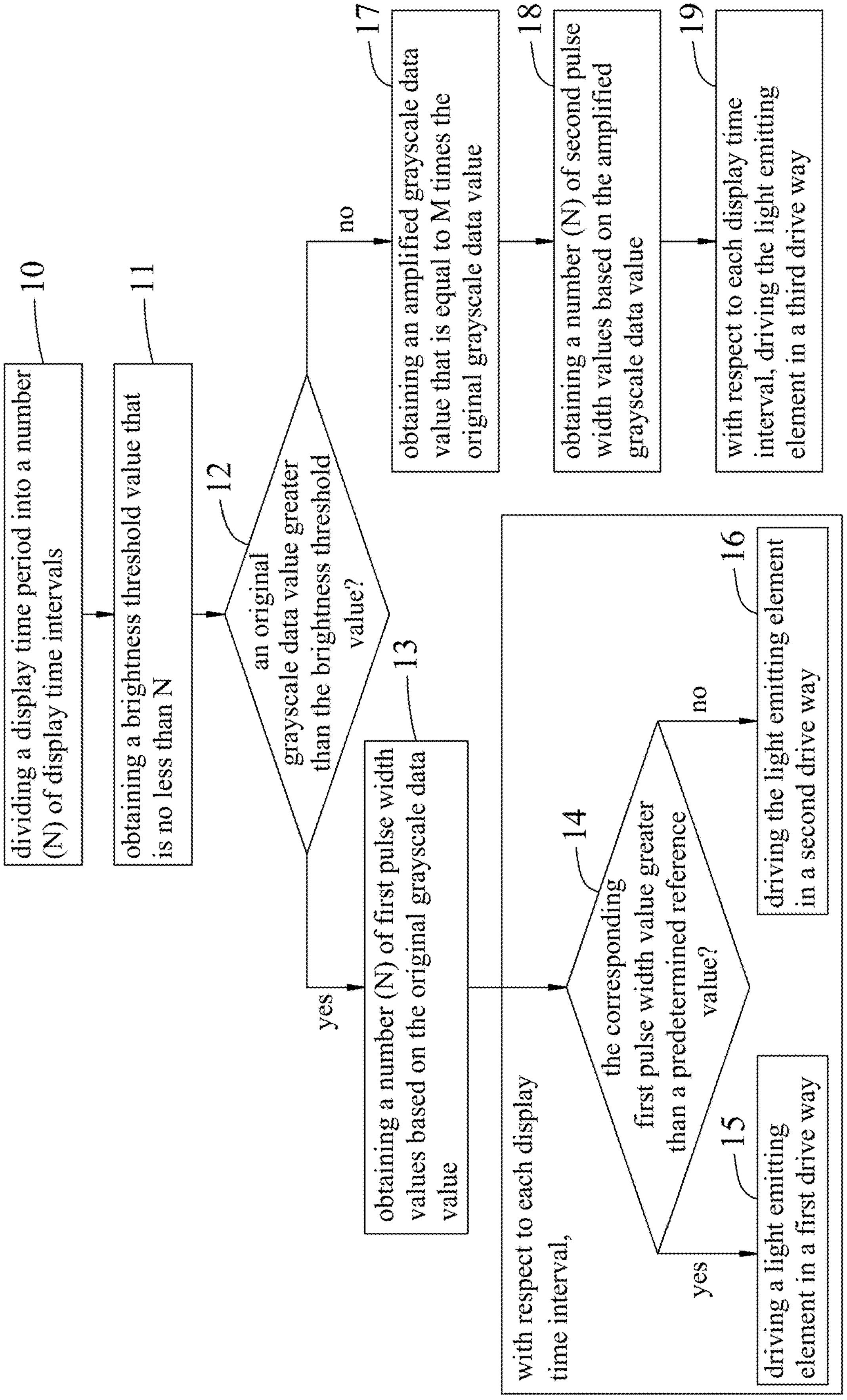
FIG. 3 is a flow chart illustrating the embodiment.

Referring to FIGS. 2 and 3, the light emission control method of this embodiment includes steps 10-19.

In step 10, the driver circuit 21 divides a display time period of the image frame into a number (N) of display time intervals, where N is an integer no less than two.

In step 11, the driver circuit 21 obtains a brightness threshold value that is no less than N. In this embodiment, the brightness threshold value is equal to N.

In step 12, the driver circuit 21 determines whether an original grayscale data value that corresponds to a to-be-displayed grayscale value contained in the image frame is greater than the brightness threshold value. If a result of the determination is affirmative, the flow proceeds to step 13. If the result of the determination is negative, the flow proceeds to step 17.

In step 13, the driver circuit 21 obtains a number (N) of first pulse width values that respectively correspond to the display time intervals, where each of the first pulse width values is no less than one, and a sum of the first pulse width values is equal to the original grayscale data value.

In this embodiment: when the original grayscale data value is divisible by N, each of the first pulse width values is equal to Q; and when the original grayscale data value is not divisible by N, each of the first pulse width values that respectively correspond to a first one to an $R^{th}$ one of the display time intervals is equal to Q+1, and each of the first pulse width values that respectively correspond to an $(R+1)^{th}$ one to an $N^{th}$ one of the display time intervals is equal to Q, where Q is a quotient of the original grayscale data value divided by N, and R is a remainder of the original grayscale data value divided by N. However, the disclosure is not limited to such a configuration.

The driver circuit 21 executes steps 14-16 with respect to each of the display time intervals.

In step 14, the driver circuit 21 determines whether the first pulse width value that corresponds to the display time interval is greater than a predetermined reference value. In this embodiment, the predetermined reference value is one. If a result of the determination is affirmative, the flow proceeds to step 15. If the result of the determination is negative, the flow proceeds to step 16.

In step 15, the driver circuit 21 drives the light emitting element 23 in a first drive way so that a current flows through the light emitting element 23 during a light emission time segment in the display time interval, a magnitude of the current is equal to a predetermined current value, and a length of the light emission time segment is equal to the first pulse width value that corresponds to the display time interval times a predetermined time length.

In step 16, the driver circuit 21 drives the light emitting element 23 in a second drive way so that a current flows through the light emitting element 23 during a light emission time segment in the display time interval, a magnitude of the current is less than the predetermined current value, and a length of the light emission time segment is greater than the first pulse width value that corresponds to the display time interval times the predetermined time length.

In this embodiment, when the light emitting element 23 is driven in the second drive way, the magnitude of the current causes the light emitting element 23 to have a brightness that is 1/M times the brightness of the light emitting element 23 when being driven by a current having a magnitude of the predetermined current value, and the length of the light emission time segment is equal to M times a product of the first pulse width value that corresponds to the display time interval and the predetermined time length, where M is an integer no less than two.

In another embodiment, when the light emitting element 23 is driven in the second drive way: the light emission time segment may include a number (M) of light emission time slices; and with respect to an $i^{th}$ one of the light emission time slices, the magnitude of the current may be equal to i/M times the predetermined current value during the light emission time slice, and a length of the light emission time slice may be equal to ai times the product of the first pulse width value that corresponds to the display time interval and the predetermined time length, where 1≤i≤M and $$\sum_{i-1}^{M} a_i \cdot i = M.$$

A relationship between the magnitude of the conduction current and the brightness of the light emitting element 23 is not absolutely linear. By virtue of executing both of steps 15 and 16 with respect to the display time period when the original grayscale data value is greater than and close to the brightness threshold value, brightness of the light emitting element 23 can be controlled precisely, thereby alleviating brightness discontinuity of the light emitting element 23.

In step 17, the driver circuit 21 obtains an amplified grayscale data value that is equal to M times the original grayscale data value.

In step 18, the driver circuit 21 obtains a number (N) of second pulse width values that respectively correspond to the display time intervals, where each of the second pulse width values is no less than zero, a sum of the second pulse width values is equal to the amplified grayscale data value, and a difference between a maximum and a minimum of the second pulse width values is minimized.

In this embodiment: when the amplified grayscale data value is divisible by N, each of the second pulse width values is equal to Q'; and when the amplified grayscale data value is not divisible by N, each of the second pulse width values that respectively correspond to a first one to an $R'^{th}$ one of the display time intervals is equal to Q'+1, and each of the second pulse width values that respectively correspond to an $(R'+1)^{th}$ one to an $N^{th}$ one of the display time intervals is equal to Q', where Q' is a quotient of the amplified grayscale data value divided by N, and R' is a remainder of the amplified grayscale data value divided by N. However, the disclosure is not limited to such a configuration.

In step 19, with respect to each of the display time intervals: when the second pulse width value that corresponds to the display time interval is greater than zero, the driver circuit 21 drives the light emitting element 23 in a third drive way so that a current flows through the light emitting element 23 during a light emission time segment in the display time interval, a magnitude of the current causes the light emitting element 23 to have a brightness that is 1/M times the brightness of the light emitting element 23 when being driven by a current having a magnitude of the predetermined current value, and a length of the light emission time segment is equal to the second pulse width value that corresponds to the display time interval times the predetermined time length; and when the second pulse width value that corresponds to the display time interval is zero, the driver circuit 21 drives the light emitting element 23 in a fourth drive way so that no current flows through the light emitting element 23 in the display time interval.

Table 1 illustrates a ratio of the length of the light emission time segment to the predetermined time length with respect to each of the display time intervals in an example where N=16, M=4, and the original grayscale data value corresponds to the to-be-display grayscale value that falls within a range of from one to eighteen.

TABLE 1

| | | Display time interval | | | | | | | | | | | | | | | |
|---|---|---|---|---|---|---|---|---|---|---|---|---|---|---|---|---|---|
| A | B | 1 | 2 | 3 | 4 | 5 | 6 | 7 | 8 | 9 | 10 | 11 | 12 | 13 | 14 | 15 | 16 |
| 1 | 1 | 1 | 1 | 1 | 1 | 0 | 0 | 0 | 0 | 0 | 0 | 0 | 0 | 0 | 0 | 0 | 0 |
| 2 | 2 | 1 | 1 | 1 | 1 | 1 | 1 | 1 | 1 | 0 | 0 | 0 | 0 | 0 | 0 | 0 | 0 |
| 3 | 3 | 1 | 1 | 1 | 1 | 1 | 1 | 1 | 1 | 1 | 1 | 1 | 1 | 0 | 0 | 0 | 0 |
| 4 | 4 | 1 | 1 | 1 | 1 | 1 | 1 | 1 | 1 | 1 | 1 | 1 | 1 | 1 | 1 | 1 | 1 |
| 5 | 5 | 2 | 2 | 2 | 2 | 1 | 1 | 1 | 1 | 1 | 1 | 1 | 1 | 1 | 1 | 1 | 1 |
| 6 | 6 | 2 | 2 | 2 | 2 | 2 | 2 | 2 | 2 | 1 | 1 | 1 | 1 | 1 | 1 | 1 | 1 |
| 7 | 7 | 2 | 2 | 2 | 2 | 2 | 2 | 2 | 2 | 2 | 2 | 2 | 2 | 1 | 1 | 1 | 1 |
| 8 | 8 | 2 | 2 | 2 | 2 | 2 | 2 | 2 | 2 | 2 | 2 | 2 | 2 | 2 | 2 | 2 | 2 |

TABLE 1-continued

| | | Display time interval | | | | | | | | | | | | | | | |
|---|---|---|---|---|---|---|---|---|---|---|---|---|---|---|---|---|---|
| A | B | 1 | 2 | 3 | 4 | 5 | 6 | 7 | 8 | 9 | 10 | 11 | 12 | 13 | 14 | 15 | 16 |
| 9 | 9 | 3 | 3 | 3 | 3 | 2 | 2 | 2 | 2 | 2 | 2 | 2 | 2 | 2 | 2 | 2 | 2 |
| 10 | 10 | 3 | 3 | 3 | 3 | 3 | 3 | 3 | 3 | 2 | 2 | 2 | 2 | 2 | 2 | 2 | 2 |
| 11 | 11 | 3 | 3 | 3 | 3 | 3 | 3 | 3 | 3 | 3 | 3 | 3 | 3 | 2 | 2 | 2 | 2 |
| 12 | 13 | 4 | 4 | 4 | 4 | 3 | 3 | 3 | 3 | 3 | 3 | 3 | 3 | 3 | 3 | 3 | 3 |
| 13 | 16 | 4 | 4 | 4 | 4 | 4 | 4 | 4 | 4 | 4 | 4 | 4 | 4 | 4 | 4 | 4 | 4 |
| 14 | 19 | 2 | 2 | 2 | 4 | 4 | 4 | 4 | 4 | 4 | 4 | 4 | 4 | 4 | 4 | 4 | 4 |
| 15 | 24 | 2 | 2 | 2 | 2 | 2 | 2 | 2 | 2 | 4 | 4 | 4 | 4 | 4 | 4 | 4 | 4 |
| 16 | 28 | 2 | 2 | 2 | 2 | 2 | 2 | 2 | 2 | 2 | 2 | 2 | 2 | 4 | 4 | 4 | 4 |
| 17 | 33 | 3 | 2 | 2 | 2 | 2 | 2 | 2 | 2 | 2 | 2 | 2 | 2 | 2 | 2 | 2 | 2 |
| 18 | 39 | 3 | 3 | 3 | 3 | 3 | 3 | 3 | 2 | 2 | 2 | 2 | 2 | 2 | 2 | 2 | 2 |

A: to-be-display grayscale value
B: original grayscale data value

As shown in Table 1, when the original grayscale data value is not greater than the brightness threshold value (sixteen in this embodiment), steps 17-19 are executed. In a case where the original grayscale data value is one, the amplified grayscale data value is four (M×the original grayscale data value=4×1) according to step 17, each of the second pulse width values that respectively correspond to the first one to the fourth ((4 mod 16)$^{th}$) one of the display time intervals is one (⌊4/16⌋+1) according to step 18, each of the second pulse width values that respectively correspond to the fifth ([(4 mod 16)+1]$^{th}$) one to the sixteenth one of the display time intervals is zero (⌊4/16⌋) according to step 18, the ratio of the length of the light emission time segment to the predetermined time length with respect to each of the first one to the fourth one of the display time intervals is one (the second pulse width value that corresponds to the display time interval) according to step 19, and the ratio of the length of the light emission time segment to the predetermined time length with respect to each of the fifth one to the sixteenth one of the display time intervals is zero (the second pulse width value that corresponds to the display time interval) according to step 19. Details of a case where the original grayscale data value is any one of zero and two to thirteen can be inferred from the description above related to the case where the original grayscale data value is one, and are omitted herein for the sake of brevity. When the original grayscale data value is greater than the brightness threshold value (sixteen in this embodiment), steps 13-16 are executed. In a case where the original grayscale data value is nineteen, each of the first pulse width values that respectively correspond to the first one to the third ((19 mod 16)$^{th}$) one of the display time intervals is two (⌊19/16⌋+1) according to step 13, each of the first pulse width values that respectively correspond to the fourth ([(19 mod 16)+1]$^{th}$) one to the sixteenth one of the display time intervals is one (⌊19/16⌋) according to step 13, the ratio of the length of the light emission time segment to the predetermined time length with respect to each of the first one to the third one of the display time intervals is two (the first pulse width value that corresponds to the display time interval) according to step 15, and the ratio of the length of the light emission time segment to the predetermined time length with respect to each of the fourth one to the sixteenth one of the display time intervals is four (M×the first pulse width value that corresponds to the display time interval=4×1) according to step 16. Details of a case where the original grayscale data value is any one of twenty-four and twenty-eight can be inferred from the description above related to the case where the original grayscale data value is nineteen, and are omitted herein for the sake of brevity. In a case where the original grayscale data value is thirty-three, the first pulse width value that corresponds to the first ((33 mod 16)$^{th}$) one of the display time intervals is three (⌊33/16⌋+1) according to step 13, the first pulse width values that respectively correspond to the second ([(33 mod 16)+1]$^{th}$) one to the sixteenth one of the display time intervals is two (⌊33/16⌋) according to step 13, the ratio of the length of the light emission time segment to the predetermined time length with respect to the first one of the display time intervals is three (the first pulse width value that corresponds to the display time interval) according to step 15, and the ratio of the length of the light emission time segment to the predetermined time length with respect to each of the second one to the sixteenth one of the display time intervals is two (the first pulse width value that corresponds to the display time interval) according to step 15. Details of a case where the original grayscale data value is any one of thirty-nine or more can be inferred from the description above related to the case where the original grayscale data value is thirty-three, and are omitted herein for the sake of brevity.

Figure 4:
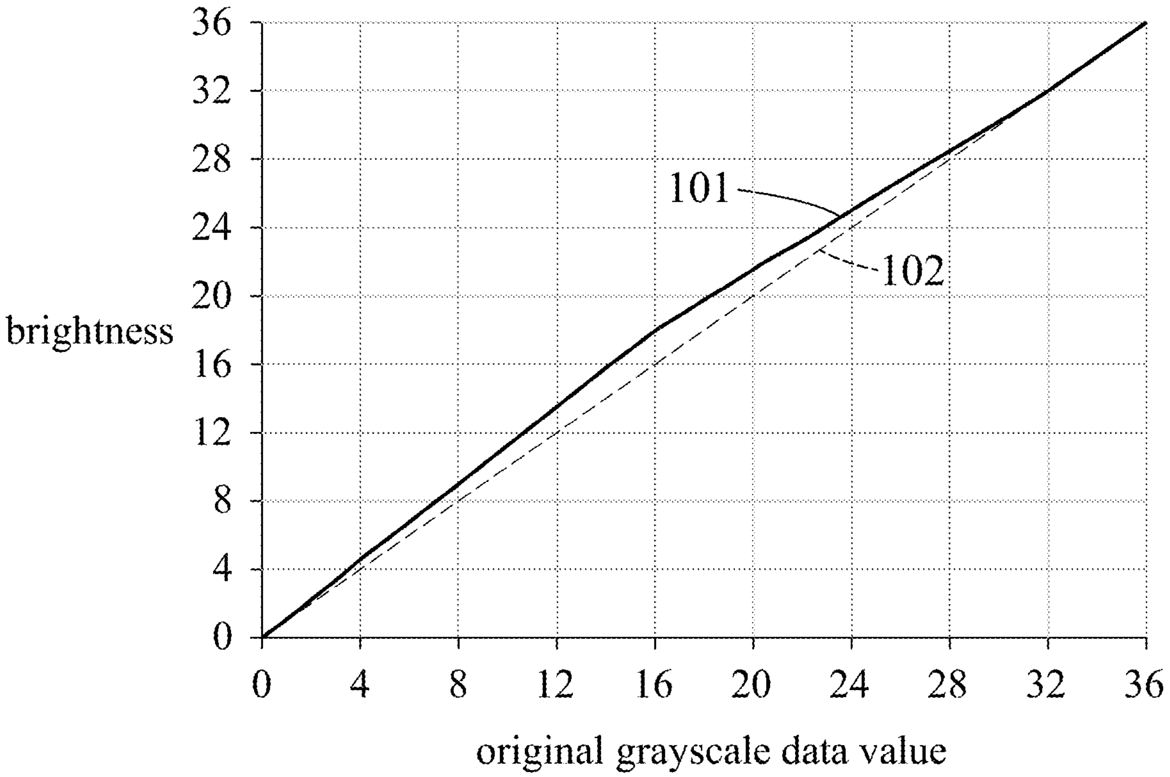
FIG. 4 is a plot illustrating a relationship between brightness and an original grayscale data value of a light emitting element controlled by the embodiment.

As shown in FIG. 4, by virtue of the driver circuit 21 performing the light emission control method of this embodiment to control each of the light emitting elements 23, a relationship between the brightness and the original grayscale data value of the light emitting element 23 is as depicted by a curve 101, which is very close to an ideal linear relationship depicted by a curve 102. Therefore, by performing the light emission control method of this embodiment, the brightness discontinuity of the light emitting element 23 can be alleviated.

In view of the above, by virtue of the driver circuit 21 performing the light emission control method of this embodiment to drive each of the light emitting elements 23 in the third drive way when the original grayscale data value is not greater than the brightness threshold value, the brightness of the light emitting element 23 can be controlled precisely, thereby alleviating the brightness discontinuity of the light emitting element 23. Moreover, by virtue of the driver circuit 21 performing the light emission control method of this embodiment to drive each of the light emitting elements 23 in both of the first drive way and the second drive way with respect to the display time period when the original grayscale data value is greater than and close to the brightness threshold value, brightness continuity of the light emitting element 23 can be enhanced.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A light emission control method to be implemented by a driver circuit, for controlling a light emitting element, and comprising steps of:

(A) dividing a display time period of an image frame into a number (N) of display time intervals, where the number (N) is an integer no less than two;

(B) obtaining a brightness threshold value that is no less than the number (N);

(C) determining whether an original grayscale data value that corresponds to a to-be-displayed grayscale value is greater than the brightness threshold value;

(D) when it is determined that the original grayscale data value is greater than the brightness threshold value, obtaining a number (N) of first pulse width values that respectively correspond to the number (N) of display time intervals, where each of the number (N) of first pulse width values is no less than one, and a sum of the number (N) of first pulse width values is equal to the original grayscale data value;

(E) with respect to each of the number (N) of display time intervals, determining whether the first pulse width value that corresponds to the display time interval is greater than a predetermined reference value;

(F) with respect to each of the number (N) of display time intervals, when it is determined that the first pulse width value that corresponds to the display time interval is greater than the predetermined reference value, driving the light emitting element in a first drive way so that a current flows through the light emitting element during a light emission time segment in the display time interval, a magnitude of the current is equal to a predetermined current value, and a length of the light emission time segment is equal to the first pulse width value that corresponds to the display time interval times a predetermined time length; and (G) with respect to each of the number (N) of display time intervals, when it is determined that the first pulse width value that corresponds to the display time interval is not greater than the predetermined reference value, driving the light emitting element in a second drive way so that a current flows through the light emitting element during a light emission time segment in the display time interval, a magnitude of the current is less than the predetermined current value, and a length of the light emission time segment is greater than the first pulse width value that corresponds to the display time interval times the predetermined time length.

2. The light emission control method as claimed in claim 1, wherein, in step (D):

when the original grayscale data value is divisible by the number (N), each of the number (N) of first pulse width values is equal to Q; and when the original grayscale data value is not divisible by the number (N), each of the first pulse width values that respectively correspond to a first one to an $R^{th}$ one of the number (N) of display time intervals is equal to Q+1, and each of the first pulse width values that respectively correspond to an $(R+1)^{th}$ one to an $N^{th}$ one of the number (N) of display time intervals is equal to Q, where Q is a quotient of the original grayscale data value divided by the number (N), and R is a remainder of the original grayscale data value divided by the number (N).

3. The light emission control method as claimed in claim 1, wherein, in step (G):

the magnitude of the current causes the light emitting element to have a brightness that is 1/M times the brightness of the light emitting element when being driven by a current having a magnitude of the predetermined current value; and the length of the light emission time segment is equal to M times a product of the first pulse width value that corresponds to the display time interval and the predetermined time length, where M is an integer no less than two.

4. The light emission control method as claimed in claim 1, wherein, in step (G):

the light emission time segment includes a number (M) of light emission time slices; and with respect to an $i^{th}$ one of the number (M) of light emission time slices, the magnitude of the current is equal to i/M times the predetermined current value during the light emission time slice, and a length of the light emission time slice is equal to ai times the product of the first pulse width value that corresponds to the display time interval and the predetermined time length, where M is an integer no less than two, 1≤i≤M, and $$\sum_{i-1}^{M} a_i \cdot i = M.$$

5. The light emission control method as claimed in claim 1, further comprising steps of:

(H) when it is determined that the original grayscale data value is not greater than the brightness threshold value, obtaining an amplified grayscale data value that is equal to M times the original grayscale data value, where M is an integer no less than two;

(I) obtaining a number (N) of second pulse width values that respectively correspond to the number (N) of display time intervals, where each of the number (N) of second pulse width values is no less than zero, a sum of the number (N) of second pulse width values is equal to the amplified grayscale data value, and a difference between a maximum and a minimum of the number (N) of second pulse width values is minimized; and (J) with respect to each of the number (N) of display time intervals, when the second pulse width value that corresponds to the display time interval is greater than zero, driving the light emitting element in a third drive way so that a current flows through the light emitting element during a light emission time segment in the display time interval, a magnitude of the current causes the light emitting element to have a brightness that is 1/M times the brightness of the light emitting element when being driven by a current having a magnitude of the predetermined current value, and a length of the light emission time segment is equal to the second pulse width value that corresponds to the display time interval times the predetermined time length.

6. The light emission control method as claimed in claim 5, wherein, in step (I):

when the amplified grayscale data value is divisible by the number (N), each of the number (N) of second pulse width values is equal to Q'; and when the amplified grayscale data value is not divisible by the number (N), each of the second pulse width values that respectively correspond to a first one to an $R'^{th}$ one of the number (N) of display time intervals is equal to Q'+1, and each of the second pulse width values that respectively correspond to an $(R'+1)^{th}$ one to an $N^{th}$ one of the number (N) of display time intervals is equal to Q', where Q' is a quotient of the amplified grayscale data value divided by the number (N), and R' is a remainder of the amplified grayscale data value divided by the number (N).

7. A light emission control method to be implemented by a driver circuit, for controlling a light emitting element, and comprising steps of:

(A) determining whether an original grayscale data value is greater than a brightness threshold value;

(B) when it is determined that the original grayscale data value is greater than the brightness threshold value, obtaining a number (N) of first pulse width values that respectively correspond to a number (N) of display time intervals, where N is an integer that is no less than two and no greater than the brightness threshold value, each of the number (N) of first pulse width values is no less than one, and a sum of the number (N) of first pulse width values is equal to the original grayscale data value;

(C) with respect to each of the number (N) of display time intervals, determining whether the first pulse width value that corresponds to the display time interval is greater than a predetermined reference value;

(D) with respect to each of the number (N) of display time intervals, when it is determined that the first pulse width value that corresponds to the display time interval is greater than the predetermined reference value, driving the light emitting element in a first drive way so that a current flows through the light emitting element during a light emission time segment in the display time interval, a magnitude of the current is equal to a predetermined current value, and a length of the light emission time segment is equal to the first pulse width value that corresponds to the display time interval times a predetermined time length; and (E) with respect to each of the number (N) of display time intervals, when it is determined that the first pulse width value that corresponds to the display time interval is not greater than the predetermined reference value, driving the light emitting element in a second drive way so that a current flows through the light emitting element during a light emission time segment in the display time interval, a magnitude of the current is less than the predetermined current value, and a length of the light emission time segment is greater than the first pulse width value that corresponds to the display time interval times the predetermined time length.

8. The light emission control method as claimed in claim 7, wherein, in step (B):

when the original grayscale data value is divisible by the number (N), each of the number (N) of first pulse width values is equal to Q; and when the original grayscale data value is not divisible by the number (N), each of the first pulse width values that respectively correspond to a first one to an $R^{th}$ one of the number (N) of display time intervals is equal to Q+1, and each of the first pulse width values that respectively correspond to an $(R+1)^{th}$ one to an $N^{th}$ one of the number (N) of display time intervals is equal to Q, where Q is a quotient of the original grayscale data value divided by the number (N), and R is a remainder of the original grayscale data value divided by the number (N).

9. The light emission control method as claimed in claim 7, wherein, in step (E):

the magnitude of the current causes the light emitting element to have a brightness that is 1/M times the brightness of the light emitting element when being driven by a current having a magnitude of the predetermined current value; and the length of the light emission time segment is equal to M times a product of the first pulse width value that corresponds to the display time interval and the predetermined time length, where M is an integer no less than two.

10. The light emission control method as claimed in claim 7, wherein, in step (E):

the light emission time segment includes a number (M) of light emission time slices; and with respect to an $i^{th}$ one of the number (M) of light emission time slices, the magnitude of the current is equal to i/M times the predetermined current value during the light emission time slice, and a length of the light emission time slice is equal to ai times the product of the first pulse width value that corresponds to the display time interval and the predetermined time length, where M is an integer no less than two, 1≤i≤M, and $$\sum_{i-1}^{M} a_i \cdot i = M.$$

11. The light emission control method as claimed in claim 7, further comprising steps of:

(F) when it is determined that the original grayscale data value is not greater than the brightness threshold value, obtaining an amplified grayscale data value that is equal to M times the original grayscale data value, where M is an integer no less than two;

(G) obtaining a number (N) of second pulse width values that respectively correspond to the number (N) of display time intervals, where each of the number (N) of second pulse width values is no less than zero, a sum of the number (N) of second pulse width values is equal to the amplified grayscale data value, and a difference between a maximum and a minimum of the number (N) of second pulse width values is minimized; and (H) with respect to each of the number (N) of display time intervals, when the second pulse width value that corresponds to the display time interval is greater than zero, driving the light emitting element in a third drive way so that a current flows through the light emitting element during a light emission time segment in the display time interval, a magnitude of the current causes the light emitting element to have a brightness that is 1/M times the brightness of the light emitting element when being driven by a current having a magnitude of the predetermined current value, and a length of the light emission time segment is equal to the second pulse width value that corresponds to the display time interval times the predetermined time length.

12. The light emission control method as claimed in claim 11, wherein, in step (G):

when the amplified grayscale data value is divisible by the number (N), each of the number (N) of second pulse width values is equal to Q'; and when the amplified grayscale data value is not divisible by the number (N), each of the second pulse width values that respectively correspond to a first one to an R'$^{th}$ one of the number (N) of display time intervals is equal to Q'+1, and each of the second pulse width values that respectively correspond to an (R'+1)$^{th}$ one to an N$^{th}$ one of the number (N) of display time intervals is equal to Q', where Q' is a quotient of the amplified grayscale data value divided by the number (N), and R' is a remainder of the amplified grayscale data value divided by the number (N).

* * * * *